United States Patent
Ohashi

(10) Patent No.: US 8,402,753 B2
(45) Date of Patent: Mar. 26, 2013

(54) EXHAUST GAS PURIFICATION SYSTEM FOR AN INTERNAL COMBUSTION ENGINE

(75) Inventor: Nobumoto Ohashi, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 229 days.

(21) Appl. No.: 12/680,332

(22) PCT Filed: Sep. 26, 2008

(86) PCT No.: PCT/JP2008/067532
§ 371 (c)(1),
(2), (4) Date: Mar. 26, 2010

(87) PCT Pub. No.: WO2009/041641
PCT Pub. Date: Apr. 2, 2009

(65) Prior Publication Data
US 2010/0242480 A1 Sep. 30, 2010

(30) Foreign Application Priority Data
Sep. 27, 2007 (JP) .................................. 2007-251983

(51) Int. Cl.
*F01N 3/00* (2006.01)
*F01N 3/101* (2006.01)
(52) U.S. Cl. ................................ 60/295; 60/286; 60/301
(58) Field of Classification Search .................... 60/286, 60/287, 295, 301
See application file for complete search history.

(56) References Cited

U.S. PATENT DOCUMENTS

| | | | |
|---|---|---|---|
| 6,922,988 B2 * | 8/2005 | Yamaguchi et al. | 60/286 |
| 7,603,845 B2 * | 10/2009 | Dionnet et al. | 60/274 |
| 2004/0055278 A1 * | 3/2004 | Miyoshi et al. | 60/272 |

FOREIGN PATENT DOCUMENTS

| JP | A-2000-240428 | 9/2000 |
|---|---|---|
| JP | A-2002-349252 | 12/2002 |
| JP | A-2004-5256 1 | 2/2004 |
| JP | A-2004-162694 | 6/2004 |
| JP | A-2005-226463 | 8/2005 |
| JP | A-2005-291057 | 10/2005 |

OTHER PUBLICATIONS

Oct. 4, 2011 Office Action issued in Japanese Application No. 2007-251983 (with translation).
International Search Report mailed on Jan. 6, 2009 in corresponding International Application No. PCT/JP2008/067532.

* cited by examiner

*Primary Examiner* — Kenneth Bomberg
*Assistant Examiner* — Dapinder Singh
(74) *Attorney, Agent, or Firm* — Oliff & Berridge, PLC

(57) ABSTRACT

This invention is to reduce NOx occluded in a NOx catalyst in a more appropriate manner. In this invention, in case where an amount of NOx occluded when an execution condition for NOx reduction control holds is more than a predetermined amount of occlusion, NOx reduction control is performed by lowering the $O_2$ concentration of the exhaust gas by means of said $O_2$ concentration lowering means and at the same time supplying a reducing agent to the NOx catalyst by a reducing agent supplying means. In addition, in case where the amount of NOx occluded when the execution condition for NOx reduction control holds is equal to or less than the predetermined amount of occlusion, NOx reduction control is executed by supplying the reducing agent to the NOx catalyst by the reducing agent supplying means without lowering the $O_2$ concentration of the exhaust gas by the $O_2$ concentration lowering means.

6 Claims, 12 Drawing Sheets

EXHAUST GAS PURIFICATION SYSTEM FOR AN INTERNAL COMBUSTION ENGINE

This application is the national phase application under 35 U.S.C. §371 of PCT international application No. PCT/W2008/067532 filed on 26 Sep. 2008, which claims priority to Japanese patent application No. 2007-251983 filed on 27 Sep. 2007, the contents of which are incorporated herein by reference.

TECHNICAL FIELD

The present invention relates to an exhaust gas purification system for an internal combustion engine that is provided with an NOx storage reduction catalyst arranged in an exhaust passage of the internal combustion engine.

BACKGROUND ART

In Patent Document 1, there is disclosed a technique to regenerate a NOx trap catalyst arranged in an exhaust passage of a diesel engine. In this Patent Document 1, when the NOx trap catalyst is to be regenerated, an excess air factor in a cylinder is caused to lower up to a first excess air factor by means of an intake air throttle valve and an EGR. Then, after the excess air factor in the cylinder has reached the first excess air factor, an amount of fuel to be injected into the cylinder is increased, so that the excess air factor in the cylinder is caused to lower up to a second excess air factor at which the regeneration is performed.

[Patent Document 1] Japanese patent application laid-open No. 2004-52561

DISCLOSURE OF THE INVENTION

Problems to be Solved by the Invention

In case where an NOx storage reduction catalyst (hereinafter also referred to simply as a NOx catalyst) is arranged in an exhaust passage of an internal combustion engine, NOx reduction control to release the NOx occluded in the NOx catalyst and at the same time to reduce it is performed.

The present invention is to provide a technique that is able to reduce the NOx occluded in a NOx catalyst in a more appropriate manner.

Means for Solving the Problems

In the present invention, a decision as to whether an $O_2$ concentration of an exhaust gas discharged from an internal combustion engine is caused to lower at the time of the execution of NOx reduction control is made based on whether an amount of NOx occluded in a NOx catalyst at the time when an execution condition for NOx reduction control holds is more than a predetermined amount of occlusion.

More specifically, an exhaust gas purification system for an internal combustion engine according to the present invention comprises:

an NOx storage reduction catalyst that is arranged in an exhaust passage of the internal combustion engine;

an $O_2$ concentration lowering unit that lowers an $O_2$ concentration of an exhaust gas by lowering an $O_2$ concentration of a mixture in said internal combustion engine;

a reducing agent supplying unit that supplies a reducing agent to said occlusion reduction type catalyst;

a NOx occlusion amount estimation unit that estimates an amount of NOx occluded in said NOx storage reduction catalyst;

a determination unit that determines whether an execution condition for NOx reduction control to cause the NOx occluded in said NOx storage reduction catalyst to be released and at the same time reduced holds; and a NOx reduction control execution unit that executes NOx reduction control when it is determined by said determination unit that the execution condition for NOx reduction control holds;

wherein in case where the amount of NOx occluded in said NOx storage reduction catalyst at the time when the execution condition for NOx reduction control holds is more than a predetermined amount of occlusion, said NOx reduction control execution unit executes NOx reduction control by lowering the $O_2$ concentration of the exhaust gas by means of said $O_2$ concentration lowering unit and at the same time supplying the reducing agent to said NOx storage reduction catalyst by means of said reducing agent supplying unit, and in case where the amount of NOx occluded in said NOx storage reduction catalyst at the time when the execution condition for NOx reduction control holds is equal to or less than said predetermined amount of occlusion, said NOx reduction control execution unit executes NOx reduction control by supplying the reducing agent to said NOx storage reduction catalyst by means of said reducing agent supplying unit without lowering the $O_2$ concentration of the exhaust gas by means of said $O_2$ concentration lowering unit.

Here, the predetermined amount of occlusion can be a threshold for the NOx occlusion amount by which it can be determined that the NOx occluded in the NOx catalyst can be reduced to a sufficient extent even when the reducing agent is supplied to the NOx catalyst without lowering the $O_2$ concentration of the exhaust gas.

According to the present invention, when the amount of NOx occluded in the NOx catalyst is more than the predetermined amount of occlusion, NOx reduction control is performed by supplying the reducing agent to the NOx catalyst while lowering the $O_2$ concentration of the exhaust gas. As a result, insufficient reduction of the NOx occluded in the NOx catalyst can be suppressed. On the other hand, the amount of NOx occluded in the NOx catalyst is less than the predetermined amount of occlusion, NOx reduction control is performed by supplying the reducing agent to the NOx catalyst without lowering the $O_2$ concentration of the exhaust gas. As a result, it is possible to suppress the $O_2$ concentration of the mixture in the internal combustion engine from being lowered unnecessarily. Therefore, it is possible to suppress deterioration in fuel mileage and drivability as well as an increase in the emission of smoke due to the lowering of the $O_2$ concentration of the mixture in the internal combustion engine.

The higher the temperature of the NOx catalyst, the more the oxidation of the reducing agent in the NOx catalyst is facilitated when the reducing agent is supplied to the NOx catalyst. In other words, the amount of $O_2$ consumed by the oxidation of the reducing agent increases, so the $O_2$ concentration of an ambient atmosphere of the NOx catalyst is more lowered. Accordingly, the higher the temperature of the NOx catalyst, the larger becomes the threshold for the NOx occlusion amount by which the NOx occluded in the NOx catalyst can be reduced to a sufficient extent by supplying the reducing agent to the NOx catalyst without lowering the $O_2$ concentration of the exhaust gas by means of the $O_2$ concentration lowering unit.

Accordingly, in the present invention, the predetermined amount of occlusion can be made larger when the temperature of the NOx catalyst is high than when the temperature is low.

According to this, it is possible to further suppress the $O_2$ concentration of the mixture in the internal combustion engine from being lowered unnecessarily.

In addition, the higher the level of degradation of the NOx catalyst, or the more the amount of SOx occluded in the NOx catalyst, the more the oxidation ability of the NOx catalyst is lowered.

Accordingly, in the present invention, provision can be further made for a degradation level estimation unit that estimates the level of degradation of the NOx catalyst. In addition, the predetermined amount of occlusion can be made smaller when the level of degradation of the NOx catalyst estimated by the degradation level estimation unit is high than when the level of degradation is low.

Moreover, in the present invention, provision can be further made for an SOx occlusion amount estimation unit that estimates an amount of SOx occluded in the NOx catalyst. In addition, the predetermined amount of occlusion can be made smaller when the amount of SOx occluded in the NOx catalyst estimated by the SOx occlusion amount estimation unit is large than when the amount of SOx occluded is small.

According to these, the NOx occluded in the NOx catalyst can be reduced to a sufficient extent while suppressing the $O_2$ concentration of the mixture in the internal combustion engine from being lowered unnecessarily.

In the present invention, in case where the $O_2$ concentration of the exhaust gas is caused to lower by means of the $O_2$ concentration lowering unit at the time of the execution of NOx reduction control, the $O_2$ concentration of the exhaust gas can be made lower when the amount of NOx occluded in the NOx catalyst is large than when the amount of NOx occluded is small.

According to this, the NOx occluded in the NOx catalyst can be reduced to a sufficient extent while suppressing the $O_2$ concentration of the mixture in the internal combustion engine from being lowered more than necessary.

In the present invention, in case where the $O_2$ concentration of the exhaust gas is caused to lower by means of the $O_2$ concentration lowering unit at the time of the execution of the NOx reduction control, the $O_2$ concentration of the exhaust gas can be made lower when the temperature of the NOx catalyst is low than when the temperature is high.

According to this, too, the NOx occluded in the NOx catalyst can be reduced to a sufficient extent while suppressing the $O_2$ concentration of the mixture in the internal combustion engine from being lowered more than necessary.

Effect of the Invention

According to the present invention, the NOx occluded in the NOx catalyst can be reduced in a more appropriate manner.

EXPLANATION OF SYMBOLS

Figure 1:
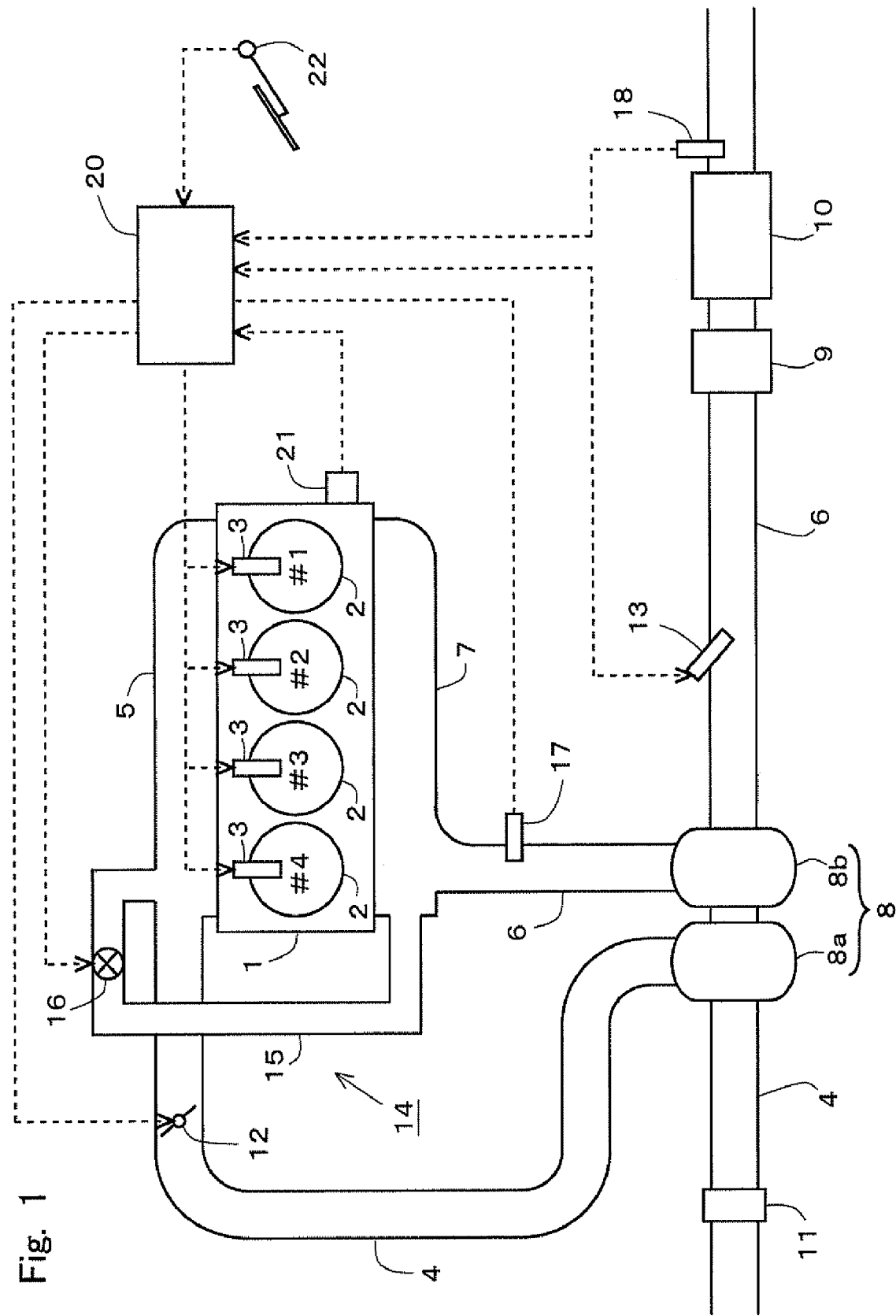
FIG. 1 is a view illustrating the schematic construction of an internal combustion engine and its intake and exhaust systems according to a first embodiment of the present invention.

1 . . . internal combustion engine
2 . . . cylinder
3 . . . fuel injection valve
4 . . . intake passage
5 . . . intake manifold
6 . . . exhaust passage
7 . . . exhaust manifold
8 . . . turbocharger
8a . . . compressor housing
8b . . . turbine housing
9 . . . oxidation catalyst
10 . . . NOx storage reduction catalyst
11 . . . air flow meter
12 . . . throttle valve
13 . . . fuel addition valve
14 . . . EGR device
15 . . . EGR passage
16 . . . EGR valve
17 . . . oxygen sensor
18 . . . temperature sensor
20 . . . ECU
21 . . . crank position sensor
22 . . . accelerator opening sensor

BEST MODE FOR CARRYING OUT THE INVENTION

Hereinafter, specific preferred embodiments of an exhaust gas purification system for an internal combustion engine according to the present invention will be described while referring to the accompanying drawings.

First Embodiment

Schematic Construction of an Internal Combustion Engine and its Intake and Exhaust Systems FIG. 1 illustrates the schematic construction of an internal combustion engine with its intake system and exhaust systems according to a first embodiment of the present invention. The internal combustion engine 1 is a diesel engine having four cylinders 2 for driving a vehicle. On each cylinder 2, there is mounted a fuel injection valve 3 for directly injecting fuel into the corresponding cylinder 2.

An intake manifold 5 and an exhaust manifold 7 are connected to the internal combustion engine 1. The intake passage 4 has its one end connected to the intake manifold 5. The exhaust passage 6 has its one end connected to the exhaust manifold 7.

A compressor housing 8a of a turbocharger 8 is arranged in the intake passage 4. A turbine housing 8b of a turbocharger 8 is arranged in the exhaust passage 6.

An air flow meter 11 is arranged in the intake passage 4 at an upstream side of the compressor housing 8a. A throttle valve 12 is arranged in the intake passage 4 at a downstream side of the compressor housing 8a.

An oxidation catalyst 9 is arranged in the exhaust passage 6 at a downstream side of the turbine housing 8b. In addition, a NOx catalyst 10 is arranged in the exhaust passage 6 at a downstream side of the oxidation catalyst 9.

A fuel addition valve 13 for adding fuel to an exhaust gas as a reducing agent is arranged in the exhaust passage 6 at a downstream side of the turbine housing 8b and at an upstream side of the oxidation catalyst 9. In the this embodiment, this fuel addition valve 13 corresponds to a reducing agent supplying unit according to the present invention.

An oxygen sensor 17 for detecting the $O_2$ concentration of the exhaust gas is arranged in the exhaust passage 6 at an upstream side of the turbine housing 8b. A temperature sensor 18 for detecting the temperature of the exhaust gas is arranged in the exhaust passage 6 at a downstream side of the NOx catalyst 10.

The internal combustion engine 1 according to this embodiment is provided with an EGR device 14 that serves to introduce a part of the exhaust gas into the intake system as an EGR gas. The EGR device 14 has an EGR passage 15 and an EGR valve 16. The EGR passage 15 has its one end connected to the exhaust manifold 7 and its other end connected to the intake manifold 5. The EGR gas is introduced from the exhaust manifold 7 into the intake manifold 5 through the EGR passage 15. The EGR valve 16 is arranged in the EGR passage 15, and the amount of EGR gas introduced into the intake manifold 5 is controlled by the EGR valve 16.

An electronic control unit (ECU) 20 is provided together with the internal combustion engine 1. This ECU 20 is a unit that controls an operating condition, etc., of the internal combustion engine 1. The air flow meter 11, the $O_2$ sensor 17, the temperature sensor 18, a crank position sensor 21, and an accelerator opening sensor 22 are electrically connected to the ECU 20. The crank position sensor 21 serves to detect the crank angle of the internal combustion engine 1. The accelerator opening sensor 22 serves to detect the degree of accelerator opening of the vehicle on which the internal combustion engine 1 is installed. Thus, the output signals of the respective sensors are input to the ECU 20.

The ECU 20 leads out the engine rotation speed of the internal combustion engine 1 based on a detected value of the crank position sensor 21. Also, the ECU 20 derives or obtains the load of the internal combustion engine 1 based on a detected value of the accelerator opening sensor 22. In addition, the ECU 20 derives or obtains the temperature of the NOx catalyst 10 based on a detected value of the temperature sensor 18.

In addition, the respective fuel injection valves 3, the throttle valve 12, the fuel addition valve 13, and the EGR valve 16 are electrically connected to the ECU 20, and these valves are controlled by the ECU 20.

<NOx Reduction Control>

In this embodiment, NOx reduction control is performed so as to release and at the same time reduce the NOx occluded in the NOx catalyst 10. In order to release and reduce the NOx occluded in the NOx catalyst 10, it is necessary to lower the air fuel ratio of an ambient atmosphere of the NOx catalyst 10 up to an air fuel ratio value at which the NOx in the NOx catalyst 10 is able to be released and reduced.

Thus, there is a case where NOx reduction control can be achieved by lowering the $O_2$ concentration of an air fuel mixture in the internal combustion engine 1 to thereby lower the $O_2$ concentration of the exhaust gas (hereinafter, such control being referred to as $O_2$ concentration lowering control) and at the same time by adding fuel from the fuel addition valve 13. In this case, fuel is supplied to the NOx catalyst 10 with the $O_2$ concentration of the ambient atmosphere of the NOx catalyst 10 being lowered. Therefore, the fuel supplied to the NOx catalyst 10 becomes easy to function as a reducing agent for reducing NOx. Accordingly, the NOx occluded in the NOx catalyst 10 can be reduced in a more efficient manner.

As the $O_2$ concentration lowering control, there can be exemplified the control to decrease the amount of intake air in the internal combustion engine 1 by decreasing the degree of opening of the throttle valve 12, the control to increase the amount of EGR gas introduced into the intake manifold 5, the control to retard the fuel injection timing of the fuel injection valves 3 and to increase the amount of fuel to be injected, and so on.

However, when the $O_2$ concentration lowering control is executed, there will be a fear that fuel mileage and drivability might be deteriorated, and an increase in the emission of smoke might be caused. In addition, the NOx occluded in the NOx catalyst 10 can be reduced by adding fuel from the fuel addition valve 13 even if the $O_2$ concentration lowering control is not executed. In this case, the efficiency of reduction of the NOx is decreased as compared with the case in which the $O_2$ concentration lowering control is executed together with the addition of fuel by the fuel addition valve 13. However, when the amount of NOx occluded in the NOx catalyst 10 is relatively small, the NOx occluded in the NOx catalyst 10 can be reduced to a satisfactory extent even if NOx reduction control is carried out only by the addition of fuel by the fuel addition valve 13.

Accordingly, in this embodiment, in case where the amount of NOx occluded in the NOx catalyst 10 at the time when an execution condition for NOx reduction control holds is more than a predetermined amount of occlusion, NOx reduction control is executed by performing the $O_2$ concentration lowering control and at the same time, adding fuel from the fuel addition valve 13. On the other hand, in case where the amount of NOx occluded in the NOx catalyst 10 at the time when the execution condition for NOx reduction control holds is equal to or less than the predetermined amount of occlusion, NOx reduction control is executed only by adding fuel from the fuel addition valve 13 without performing the $O_2$ concentration lowering control.

Here, note that the predetermined amount of occlusion is a threshold for the amount of occlusion of NOx by which it can be determined that the NOx occluded in the NOx catalyst 10 is able to be reduced to a satisfactory extent only by the addition of fuel from the fuel addition valve 13. This predetermined amount of occlusion can be determined beforehand based on experiments, etc.

Figure 2:
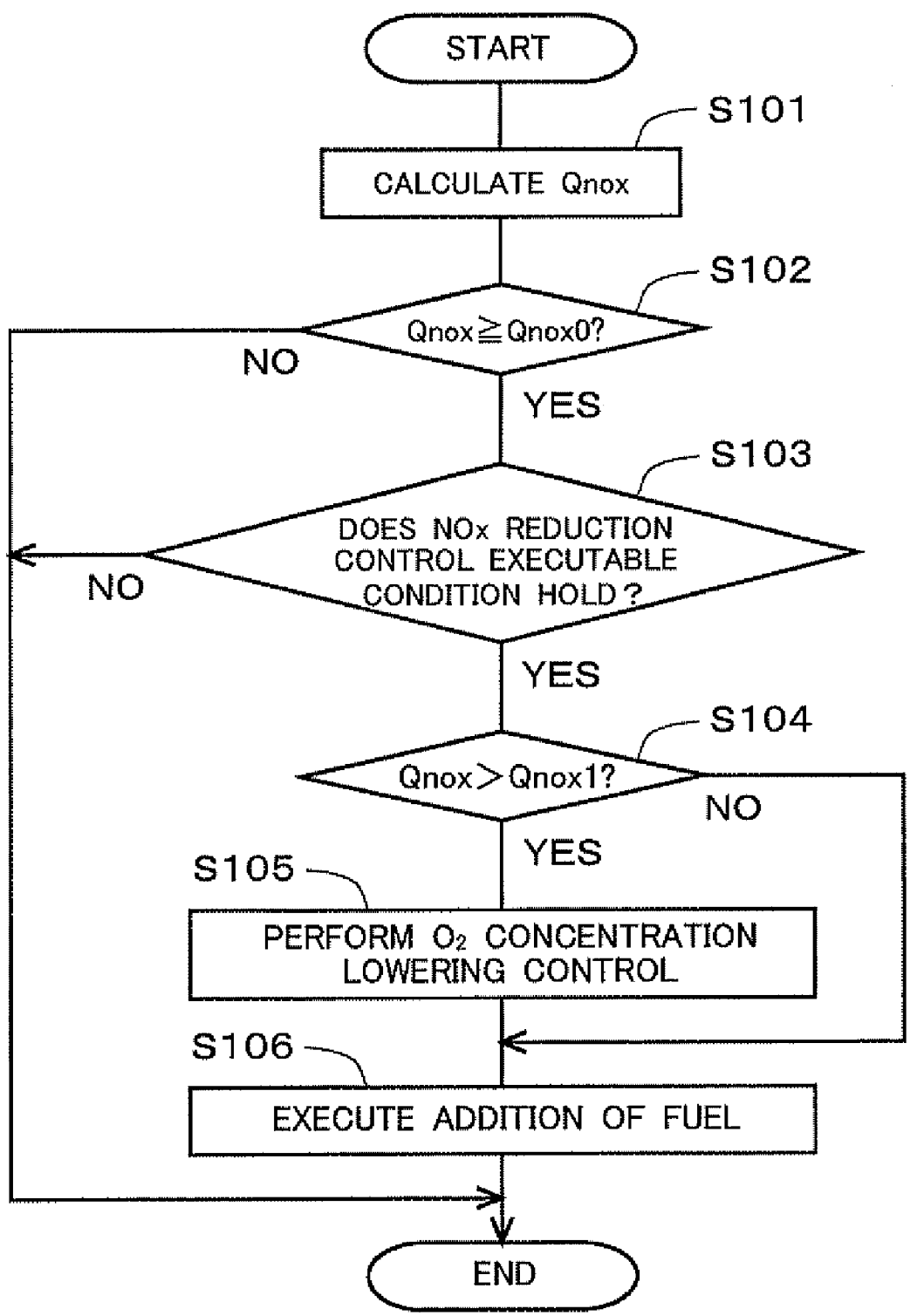
FIG. 2 is a flow chart illustrating a routine for NOx reduction control according to the first embodiment of the present invention.

Hereinafter, reference will be made to a routine for the NOx reduction control according to this embodiment based on a flow chart illustrated in FIG. 2. This routine has been beforehand stored in the ECU 20, and is executed at a specified time interval during the operation of the internal combustion engine 1.

In this routine, first in S101, the ECU 20 calculates the NOx occlusion amount (that is, the amount of NOx occluded in the NOx catalyst 10) Qnox. Here, the ECU 20 calculates the NOx occlusion amount Qnox based on, for example, an amount of accumulation of the amounts of fuel injected in the internal combustion engine 1 from a time point at which the execution of the last NOx reduction control was terminated. In this embodiment, the ECU 20 executing this S101 corresponds to the NOx occlusion amount estimation unit according to the present invention.

Then, the ECU 20 advances to S102, and determines whether the NOx occlusion amount Qnox in the NOx catalyst 10 is equal to or more than a reduction execution occlusion amount Qnox0 which is a threshold for the execution of the NOx reduction control. Here, note that the reduction execution occlusion amount Qnox0 is a value which is smaller than the predetermined amount of occlusion as mentioned above, and is a prescribed value. When a positive determination is made in S102, the ECU 20 advances to S103, whereas when a negative determination is made, the ECU 20 once terminates the execution of this routine.

Here, note that in S102, it can be determined whether the time elapsed from a time point at which the execution of the last NOx reduction control was terminated becomes equal to or more than a predetermined threshold for the execution of the NOx reduction control, in place of the NOx occlusion amount Qnox in the NOx catalyst 10.

The ECU 20 having advanced to S103 determines whether a condition under which NOx reduction control can be executed holds. For example, when the temperature of the NOx catalyst 10 is lower than an activation temperature thereof, a determination is made that the condition under which NOx reduction control can be executed does not hold. When a positive determination is made in S103, the ECU 20 advances to S104, whereas when a negative determination is made, the ECU 20 once terminates the execution of this routine.

Here, note that in this embodiment, the ECU 20 executing S102 and S103 corresponds to a determination unit according to the present invention.

The ECU 20 having advanced to S104 determines whether the NOx occlusion amount Qnox in the NOx catalyst 10 is more than a predetermined amount of occlusion Qnox1. When a positive determination is made in S104, the ECU 20 proceeds to step S105, whereas when a negative determination is made, the ECU 20 proceeds to S106.

In S105, the ECU 20 executes $O_2$ concentration lowering control. At this time, the ECU 20 lowers the $O_2$ concentration of the exhaust gas (the detected value of the oxygen sensor 17) to be discharged from the internal combustion engine 1 up to a prescribed target $O_2$ concentration. Here, even if the $O_2$ concentration of the exhaust gas is controlled to the target $O_2$ concentration, the air fuel ratio of the exhaust gas is not lowered up to a target air fuel ratio. The target air fuel ratio is an air fuel ratio at which the NOx occluded in the NOx catalyst 10 can be released and reduced. This target air fuel ratio can be obtained beforehand based on experiments, etc.

In S106, the ECU 20 executes the addition of fuel by means of the fuel addition valve 13. Here, the ECU 20 controls the amount of fuel to be added from the fuel addition valve 13 in such a manner that the air fuel ratio of the exhaust gas flowing into the NOx catalyst 10 becomes equal to the target air fuel ratio. Thereafter, the ECU 20 once terminates the execution of this routine.

Here, note that in this embodiment, the ECU 20 executing S105 and S106, or the ECU 20 executing S106 alone, corresponds to a NOx reduction control execution unit according to the present invention.

According to the routine as stated above, when the NOx occlusion amount Qnox in the NOx catalyst 10 is more than the predetermined amount of occlusion Qnox1, NOx reduction control is performed by supplying fuel to the NOx catalyst 10 while lowering the $O_2$ concentration of the exhaust gas to be discharged from the internal combustion engine 1. As a result, insufficient reduction of the NOx occluded in the NOx catalyst 10 can be suppressed. In other words, it is possible to suppress an excessive amount of NOx from remaining in the NOx catalyst 10 when the NOx reduction control is terminated.

Also, according to the routine as stated above, when the NOx occlusion amount Qnox in the NOx catalyst 10 is equal to or less than the predetermined amount of occlusion Qnox1, NOx reduction control is performed only by supplying fuel to the NOx catalyst 10 without lowering the $O_2$ concentration of the exhaust gas from the internal combustion engine 1. As a result, it is possible to suppress the $O_2$ concentration of the mixture in the internal combustion engine 1 from being lowered unnecessarily. Therefore, it is possible to suppress deterioration in fuel mileage and drivability as well as an increase in the emission of smoke due to the lowering of the $O_2$ concentration of the mixture in the internal combustion engine 1.

As described above, according to the present invention, the NOx occluded in the NOx catalyst 10 can be reduced in a more appropriate manner.

Here, note that in this embodiment, fuel has been supplied to the NOx catalyst 10 by adding fuel from the fuel addition valve 13 arranged in the exhaust passage 6. However, fuel can be supplied to the NOx catalyst 10 by executing auxiliary fuel injection by means of the fuel injection valves 3 of the internal combustion engine 1 at a time later than main fuel injection.

Second Embodiment

The overall construction of an internal combustion engine and its intake and exhaust systems according to this second embodiment of the present invention is similar to that of the first embodiment.

<NOx Reduction Control>

Figure 3:
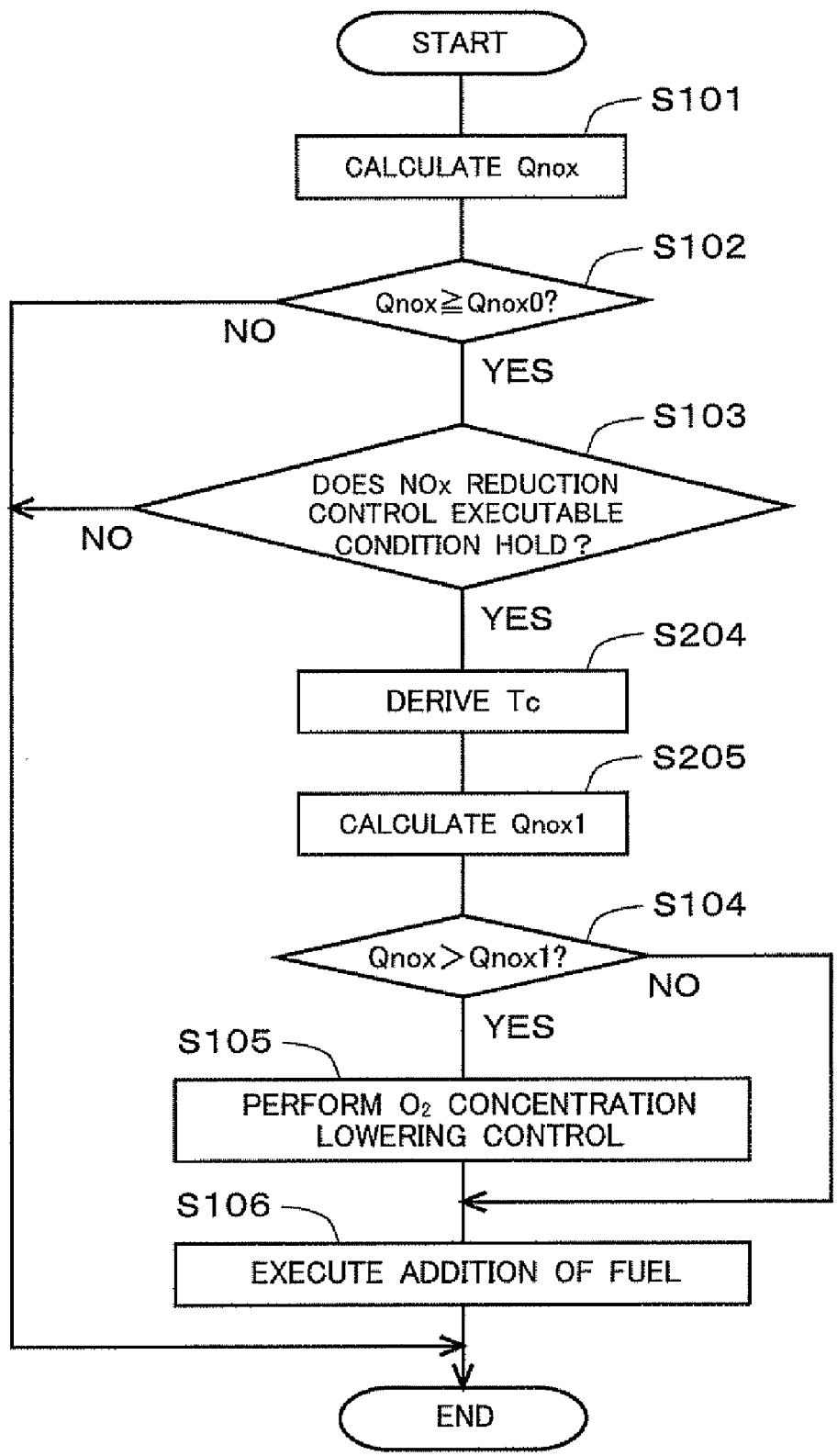
FIG. 3 is a flow chart illustrating a routine for NOx reduction control according to a second embodiment of the present invention.

Hereinafter, reference will be made to a routine for the NOx reduction control according to this embodiment based on a flow chart illustrated in FIG. 3. This routine has been beforehand stored in the ECU 20, and is executed at a specified time interval during the operation of the internal combustion engine 1. Here, note that the flow chart illustrated in FIG. 3 has steps S204 and S205 added to the flow chart illustrated in FIG. 2. Therefore, only the steps S204 and S205 will be explained, while omitting an explanation of the other steps.

In this routine, when a positive determination is made in step S103, the ECU 20 advances to S204. In S204, the ECU 20 derives or obtains the temperature Tc of the NOx catalyst 10 based on a detected value of the temperature sensor 18.

Figure 4:
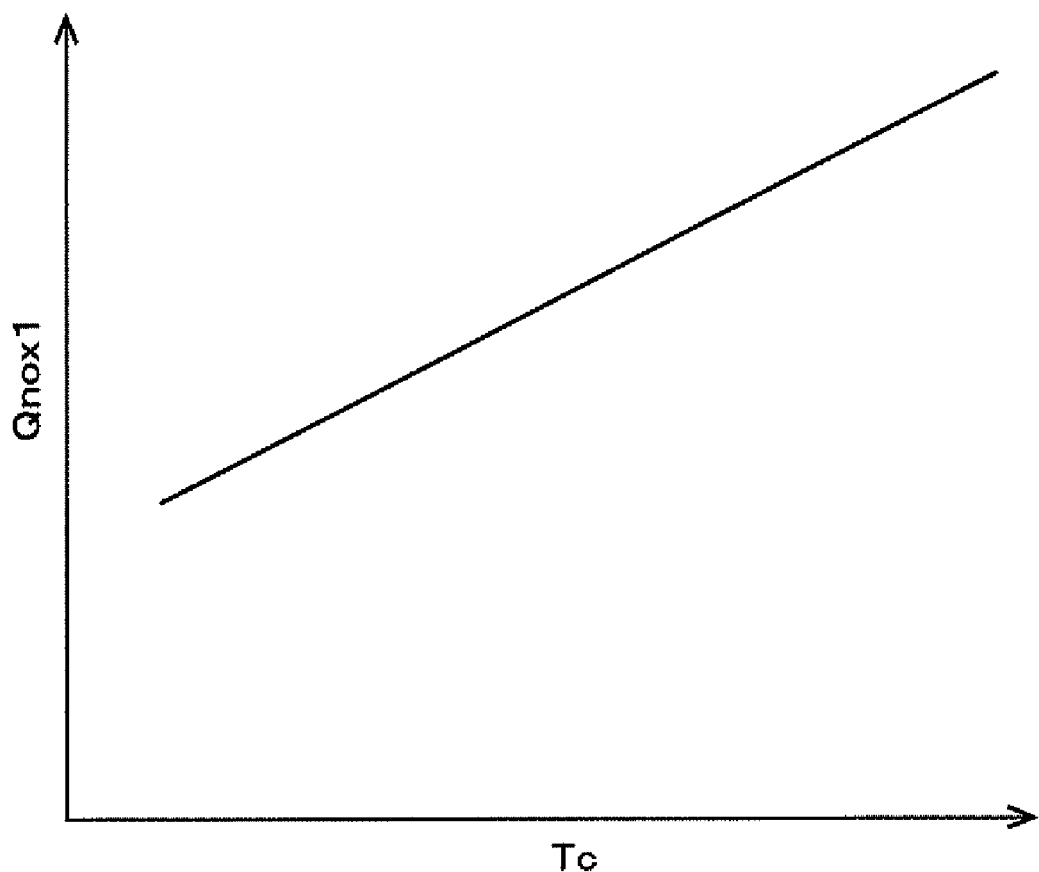
FIG. 4 is a map illustrating the relation between a predetermined amount of occlusion and the temperature of a NOx catalyst according to the second embodiment of the present invention.

Then, the ECU 20 advances to S205, and calculates the predetermined amount of occlusion Qnox1 by assigning the temperature Tc of the NOx catalyst 10 derived in S204 to a map illustrated in FIG. 4. In FIG. 4, the axis of ordinate denotes the predetermined amount of occlusion Qnox1 and the axis of abscissa denotes the temperature Tc of the NOx catalyst 10. This map has been stored in the ECU 20 beforehand. Here, note that this map can be such that the predetermined amount of occlusion Qnox1 changes with respect to the temperature Tc of the NOx catalyst 10 in a stepwise manner.

The fuel added from the fuel addition valve 13 and supplied to the NOx catalyst 10 functions as a reducing agent for reducing the NOx therein when the $O_2$ concentration of the ambient atmosphere of the NOx catalyst 10 lowers to a certain extent. In addition, the higher the temperature Tc of the NOx catalyst 10, the more the oxidation of the fuel supplied to the NOx catalyst 10 is facilitated. Therefore, even if the air fuel ratio of the exhaust gas discharged from the internal combustion engine 1 is the same or unchanged, the higher the temperature Tc of the NOx catalyst 10, the more the $O_2$ concentration of the ambient atmosphere of the NOx catalyst 10 lowers at the time when fuel is supplied to the NOx catalyst 10. Accordingly, a threshold for the amount of NOx occluded, below which the NOx occluded in the NOx catalyst 10 can be reduced to a satisfactory extent only by adding fuel from the fuel addition valve 13 without executing the $O_2$ concentration lowering control, becomes larger as the temperature of the NOx catalyst 10 is higher.

Accordingly, in this embodiment, the higher the temperature Tc of the NOx catalyst 10 at the time of the execution of the NOx reduction control, the higher the predetermined amount of occlusion Qnox1 is set to be, as shown in FIG. 4.

After S205, the ECU 20 advances to S104.

According to the routine as stated above, the predetermined amount of occlusion Qnox1 is changed based on the temperature Tc of the NOx catalyst 10 at the time of the execution of the NOx reduction control. As a result, unnecessary execution of the $O_2$ concentration lowering control at the time of the execution of the NOx reduction control is suppressed. In other words, it is possible to further suppress the $O_2$ concentration of the mixture in the internal combustion engine 1 from being lowered unnecessarily. Accordingly, the deterioration of fuel mileage and drivability as well as the generation of smoke can be further suppressed.

<First Modification>

Figure 5:
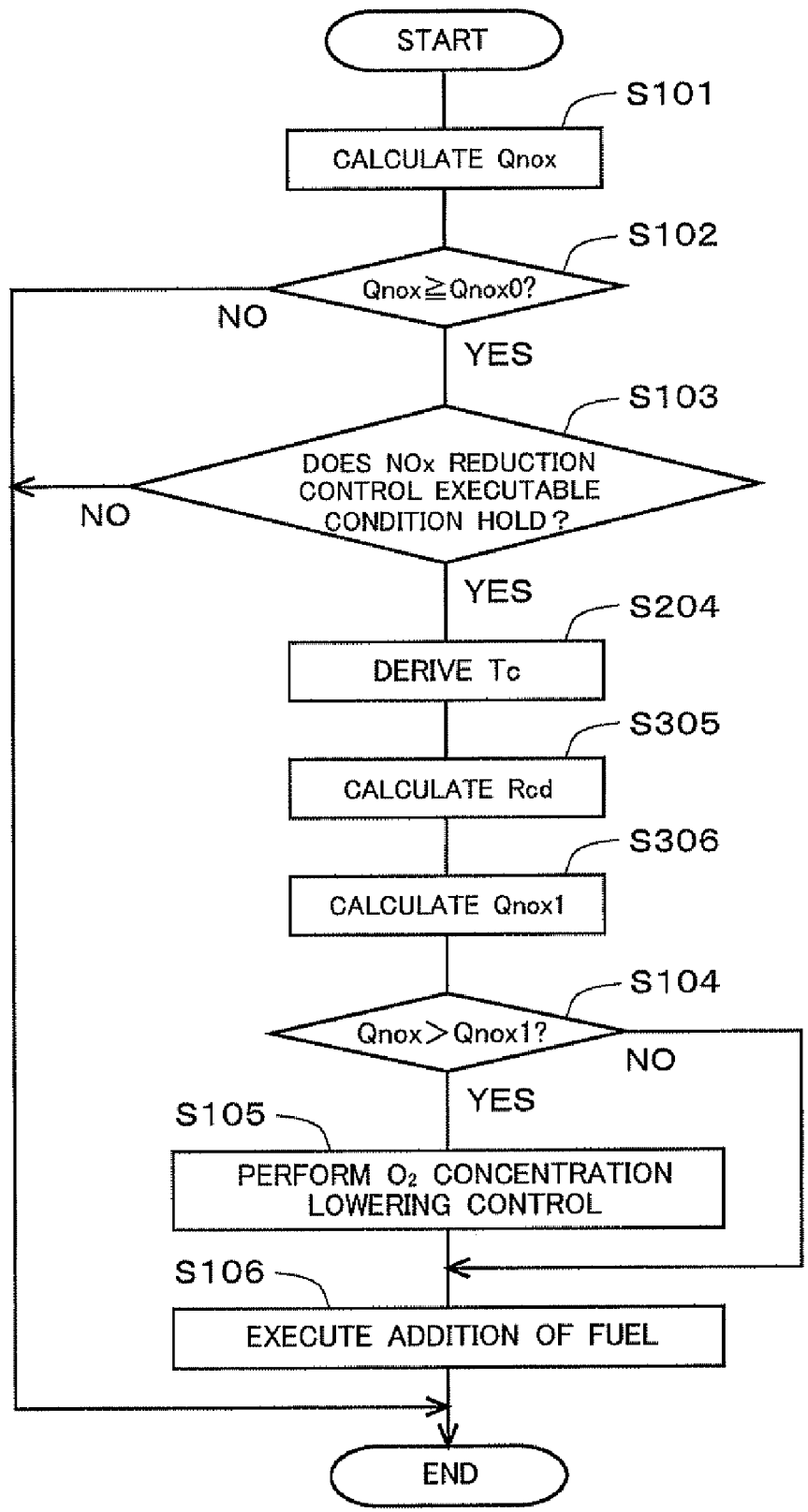
FIG. 5 is a flow chart illustrating a routine for NOx reduction control according to a first modification of the second embodiment of the present invention.

Now, reference will be made to a first modification of the second embodiment based on FIG. 5. FIG. 5 is a flow chart illustrating a routine for NOx reduction control according to this modification. This routine has been beforehand stored in the ECU 20, and is executed at a specified time interval during the operation of the internal combustion engine 1. The flow chart illustrated in FIG. 5 has S305 and S306 substituted for S205 in the flow chart illustrated in FIG. 3. Therefore, only steps S305 and S306 will be described below while omitting an explanation of other steps.

In this routine, the ECU 20 advances to S305 after S204. In S305, the ECU 20 calculates the level of degradation Rcd of the NOx catalyst 10. Here, the level of degradation Rcd of the NOx catalyst 10 is calculated based on the temperature history of the NOx catalyst 10 or the like. In this modification, the ECU 20 executing this S305 corresponds to a degradation level estimation unit according to the present invention.

Figure 6:
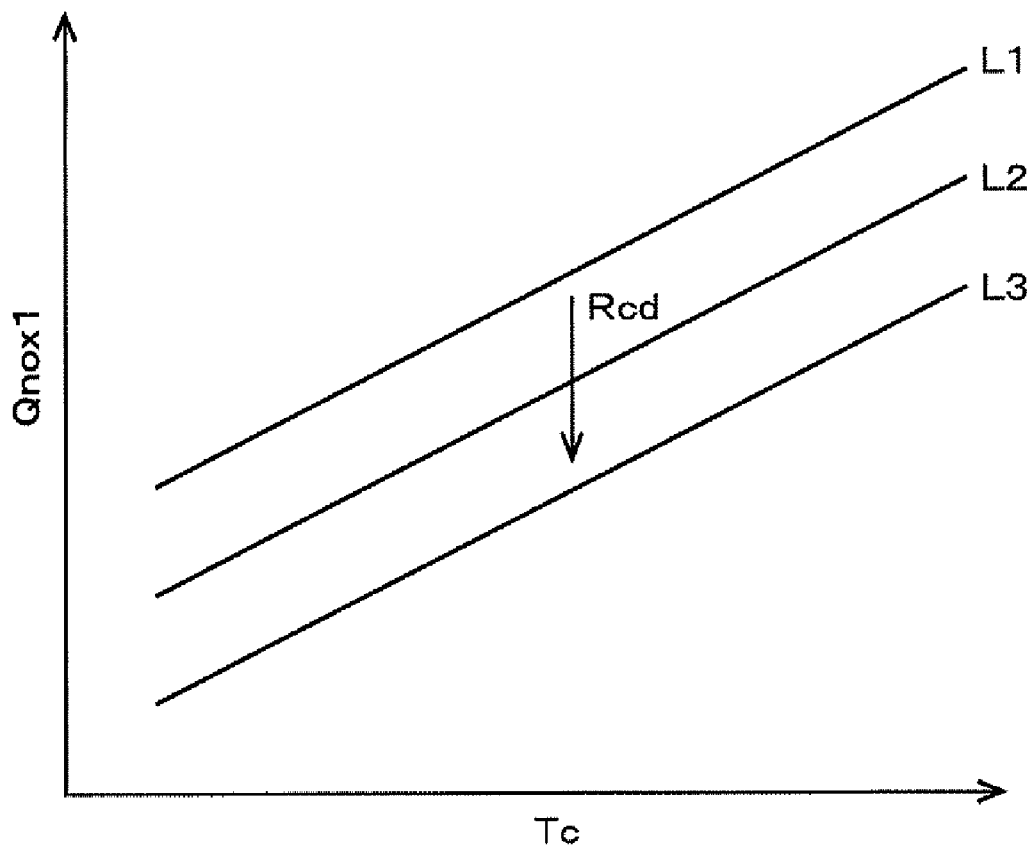
FIG. 6 is a map illustrating the relation among a predetermined amount of occlusion, the temperature of a NOx catalyst, and the level of degradation of the NOx catalyst according to the first modification of the second embodiment of the present invention.

Then, the ECU 20 advances to S306, and calculates the predetermined amount of occlusion Qnox1 by assigning the temperature Tc of the NOx catalyst 10 derived in S204 and the level of degradation Rcd of the NOx catalyst 10 calculated in S305 to a map illustrated in FIG. 6. In FIG. 6, the axis of ordinate denotes the predetermined amount of occlusion Qnox1, and the axis of abscissa denotes the temperature Tc of the NOx catalyst 10. Also, in FIG. 6, an arrow indicates the level of degradation Rcd of the NOx catalyst 10. In other words, in the map of FIG. 6, there is illustrated the relation between the temperature Tc of the NOx catalyst 10 and the predetermined amount of occlusion Qnox1 corresponding to the level of degradation Rcd of the NOx catalyst 10 (wherein L1 shows a case in which the level of degradation Rcd of the NOx catalyst 10 is lower than that in L2, and L2 shows a case in which the level of degradation Rcd of the NOx catalyst 10 is lower than that in L3). This map has been stored in the ECU 20 beforehand. Here, note that this map, similar to the map illustrated in FIG. 4, can be such that the predetermined amount of occlusion Qnox1 changes with respect to the temperature Tc of the NOx catalyst 10 in a stepwise manner.

The higher the level of degradation Rcd of the NOx catalyst 10, the more difficult fuel becomes to be oxidized in the NOx catalyst 10 when it is supplied to the NOx catalyst 10. In other words, even if the temperature Tc of the NOx catalyst 10 is the same or unchanged, the higher the level of degradation Rcd of the NOx catalyst 10, the more difficult the $O_2$ concentration of the ambient atmosphere of the NOx catalyst 10 is to lower when fuel is supplied to the NOx catalyst 10.

Accordingly, in this modification, the higher the temperature Tc of the NOx catalyst 10 at the time of the execution of the NOx reduction control, the higher the predetermined amount of occlusion Qnox1 is set to be, as shown in FIG. 6. In addition, the higher the level of degradation Rcd of the NOx catalyst 10 at the time of the execution of the NOx reduction control, the lower the predetermined amount of occlusion Qnox1 corresponding to the same temperature Tc of the NOx catalyst 10 is set to be.

According to the routine as stated above, the predetermined amount of occlusion Qnox1 is decided by taking into consideration not only the temperature Tc of the NOx catalyst 10 but also the level of degradation Rcd of the NOx catalyst 10 at the time of the execution of the NOx reduction control. As a result, it is possible to reduce the NOx occluded in the NOx catalyst 10 to a sufficient extent while suppressing the $O_2$ concentration of the mixture in the internal combustion engine 1 from being lowered unnecessarily.

Here, note that in this modification, the predetermined amount of occlusion Qnox1 can be decided based solely on the level of degradation Rcd of the NOx catalyst 10 at the time of the execution of the NOx reduction control without considering the temperature Tc of the NOx catalyst 10. In this case, the higher the level of degradation Rcd of the NOx catalyst 10 at the time of the execution of the NOx reduction control, the lower the predetermined amount of occlusion Qnox1 is set to be.

<Second Modification>

Figure 7:
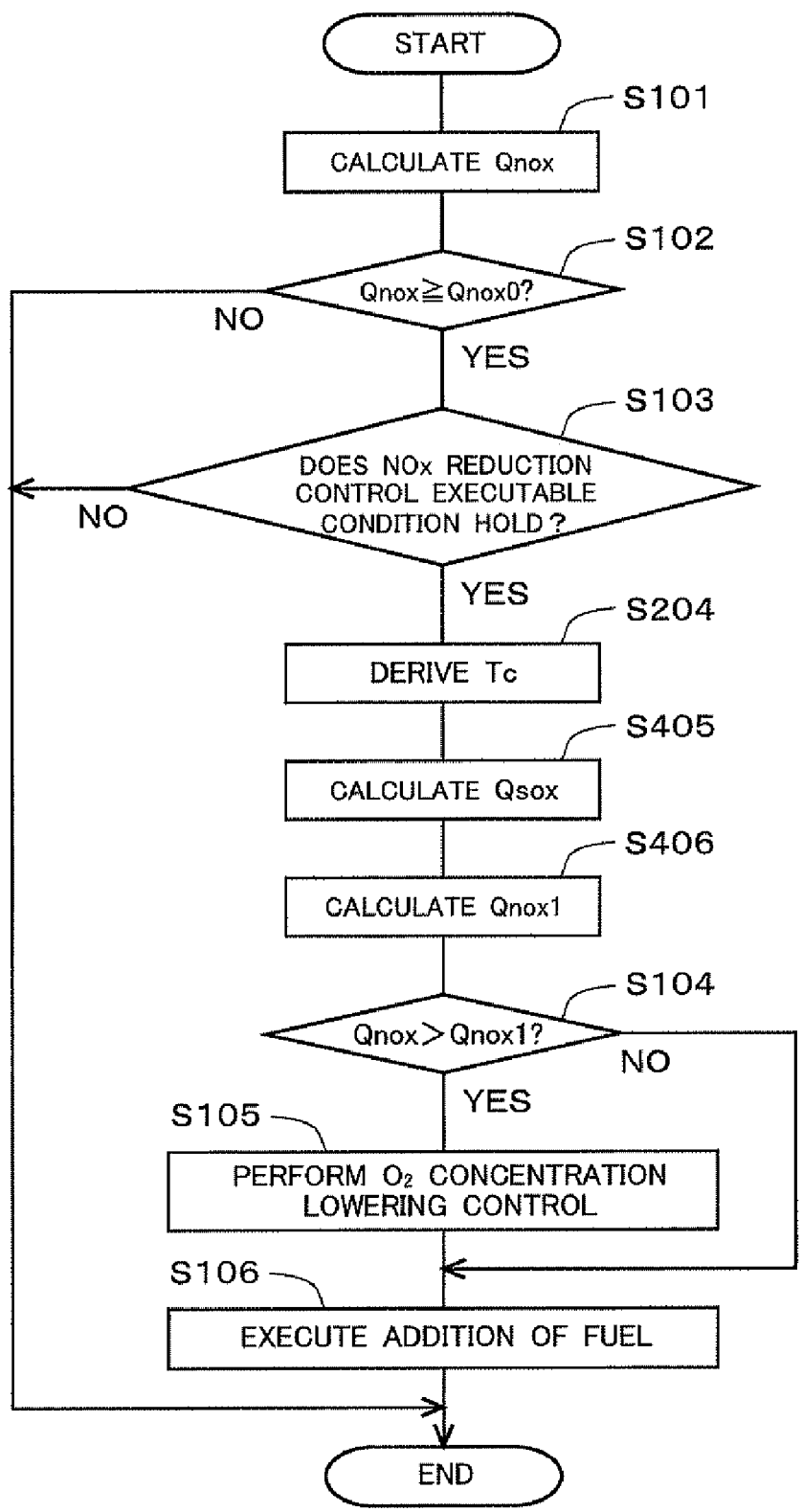
FIG. 7 is a flow chart illustrating a routine for NOx reduction control according to a second modification of the second embodiment of the present invention.

Next, reference will be made to a second modification of the second embodiment based on FIG. 7 and FIG. 8. FIG. 7 is a flowchart illustrating a routine for NOx reduction control according to this second modification. This routine has been beforehand stored in the ECU 20, and is executed at a specified time interval during the operation of the internal combustion engine 1. Here, note that the flow chart illustrated in FIG. 7 has S405 and S406 substituted for S205 in the flow chart illustrated in FIG. 3. Therefore, only S405 and S406 will be explained, while omitting an explanation of the other steps.

In this routine, the ECU 20 advances to S405 after S204. In S405, the ECU 20 calculates the SOx occlusion amount (that is, the amount of SOx occluded in the NOx catalyst 10 Qsox. Here, the ECU 20 calculates the SOx occlusion amount Qsox based on, for example, an amount of accumulation of the amounts of fuel injected in the internal combustion engine 1 from a time point at which the last release and reduction of the SOx are terminated. In this modification, the ECU 20 executing this S405 corresponds to an SOx occlusion amount estimation unit according to the present invention.

Figure 8:
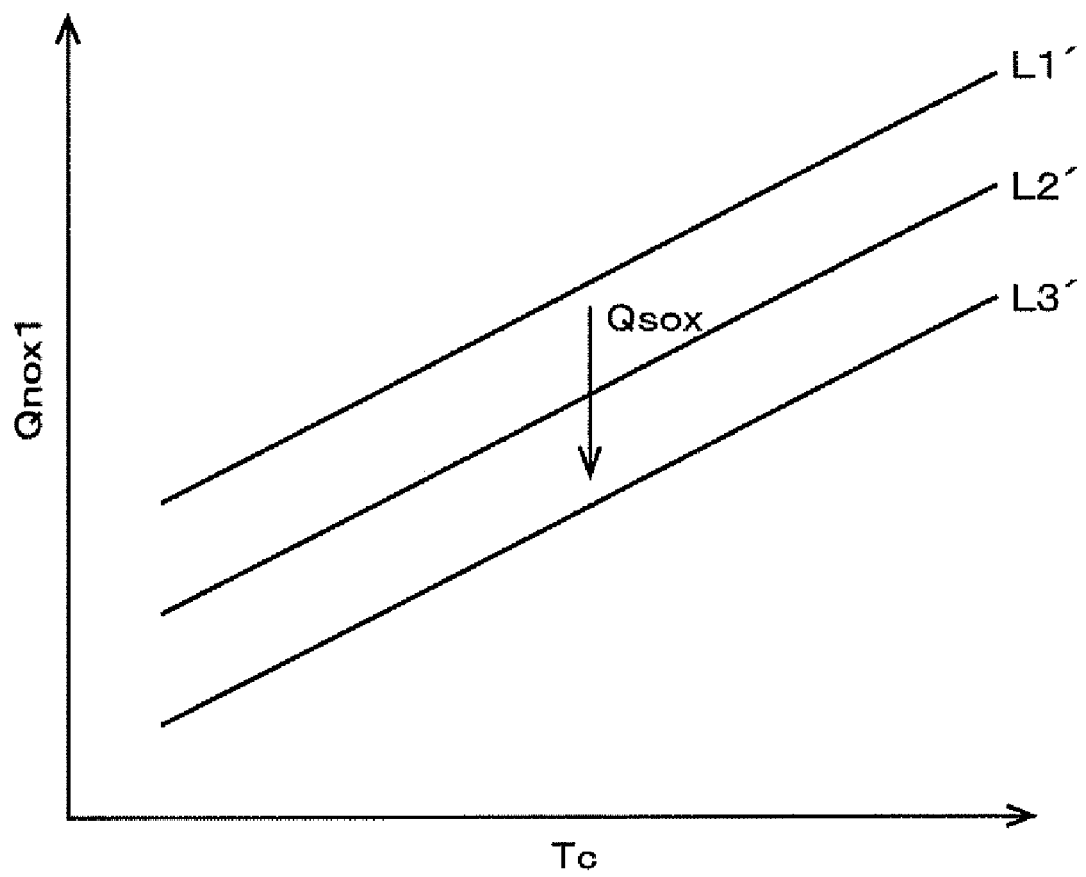
FIG. 8 is a map illustrating the relation among a predetermined amount of occlusion, the temperature of a NOx catalyst, and the level of degradation of the NOx catalyst according to the second modification of the second embodiment of the present invention.

Then, the ECU 20 advances to S406, and calculates the predetermined amount of occlusion Qnox1 by assigning the temperature Tc of the NOx catalyst 10 derived in S204 and the SOx occlusion amount Qsox in the NOx catalyst 10 calculated in S405 to a map illustrated in FIG. 8. In FIG. 8, the axis of ordinate denotes the predetermined amount of occlusion Qnox1, and the axis of abscissa denotes the temperature Tc of the NOx catalyst 10. Also, in FIG. 8, an arrow denotes the SOx occlusion amount Qsox in the NOx catalyst 10. In other words, in the map illustrated in FIG. 8, there is illustrated the relation between the temperature Tc of the NOx catalyst 10 and the predetermined amount of occlusion Qnox1 corresponding to the SOx occlusion amount Qsox in the NOx catalyst 10 (wherein L1' denotes a case in which the SOx occlusion amount Qsox in the NOx catalyst 10 is less than that in L2', and L2' denotes a case in which the SOx occlusion amount Qsox in the NOx catalyst 10 is less than that in L3'). This map has been stored in the ECU 20 beforehand. Here, note that this map, similar to the map illustrated in FIG. 4, can be such that the predetermined amount of occlusion Qnox1 changes with respect to the temperature Tc of the NOx catalyst 10 in a stepwise manner.

The more the SOx occlusion amount Qsox in the NOx catalyst 10, the more difficult fuel becomes to be oxidized in the NOx catalyst 10 when it is supplied to the NOx catalyst 10. In other words, even if the temperature Tc of the NOx catalyst 10 is the same or unchanged, the more the SOx occlusion amount Qsox in the NOx catalyst 10, the more difficult the $O_2$ concentration of the ambient atmosphere of the NOx catalyst 10 is to lower when fuel is supplied to the NOx catalyst 10.

Accordingly, in this modification, the higher the temperature Tc of the NOx catalyst 10 at the time of the execution of the NOx reduction control, the higher the predetermined amount of occlusion Qnox1 is set to be, as shown in FIG. 8. In addition, the more the SOx occlusion amount Qsox in the NOx catalyst 10 at the time of the execution of the NOx reduction control, the lower the predetermined amount of occlusion Qnox1 corresponding to the same temperature Tc of the NOx catalyst 10 is set to be.

According to the routine as stated above, the predetermined amount of occlusion Qnox1 is decided by taking into consideration not only the temperature Tc of the NOx catalyst 10 but also the SOx occlusion amount Qsox in the NOx catalyst 10 at the time of the execution of the NOx reduction control. As a result, it is possible to reduce the NOx occluded in the NOx catalyst 10 to a sufficient extent while suppressing the $O_2$ concentration of the mixture in the internal combustion engine 1 from being lowered unnecessarily.

Here, note that in this modification, the predetermined amount of occlusion Qnox1 can be decided based solely on the SOx occlusion amount Qsox in the NOx catalyst 10 at the time of the execution of the NOx reduction control without considering the temperature Tc of the NOx catalyst 10. In this case, the more the SOx occlusion amount Qsox in the NOx catalyst 10 at the time of the execution of the NOx reduction control, the lower the predetermined amount of occlusion Qnox1 is set to be.

In this embodiment, the first and second modifications can be combined with each other. That is, the predetermined amount of occlusion Qnox1 can be decided based on the temperature Tc of the NOx catalyst 10, the level of degradation Rcd of the NOx catalyst 10, and the SOx occlusion amount Qsox of the NOx catalyst 10 at the time of the execution of the NOx reduction control.

Third Embodiment

The overall construction of an internal combustion engine and its intake and exhaust systems according to this third embodiment of the present invention is similar to that of the first embodiment.

<NOx Reduction Control>

Figure 9:
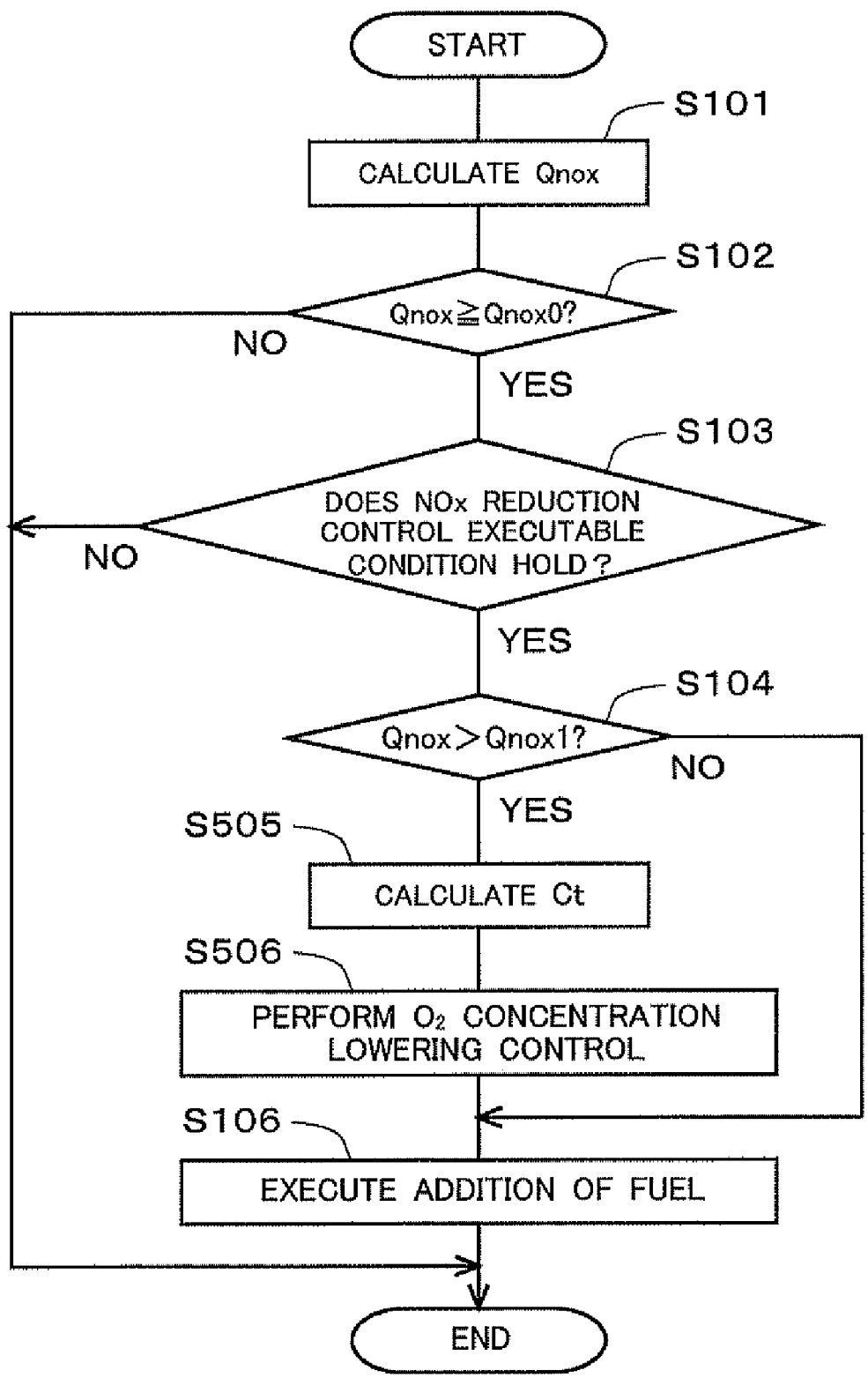
FIG. 9 is a flow chart illustrating a routine for NOx reduction control according to a third embodiment of the present invention.

Hereinafter, reference will be made to a routine for the NOx reduction control according to this embodiment based on a flow chart illustrated in FIG. 9. This routine has been beforehand stored in the ECU 20, and is executed at a specified time interval during the operation of the internal combustion engine 1. Here, note that the flow chart illustrated in FIG. 9 has steps S505 and S506 substituted for S105 in the flow chart illustrated in FIG. 2. Therefore, only steps SS505 and 506 will be described below while omitting an explanation of other steps.

Figure 10:
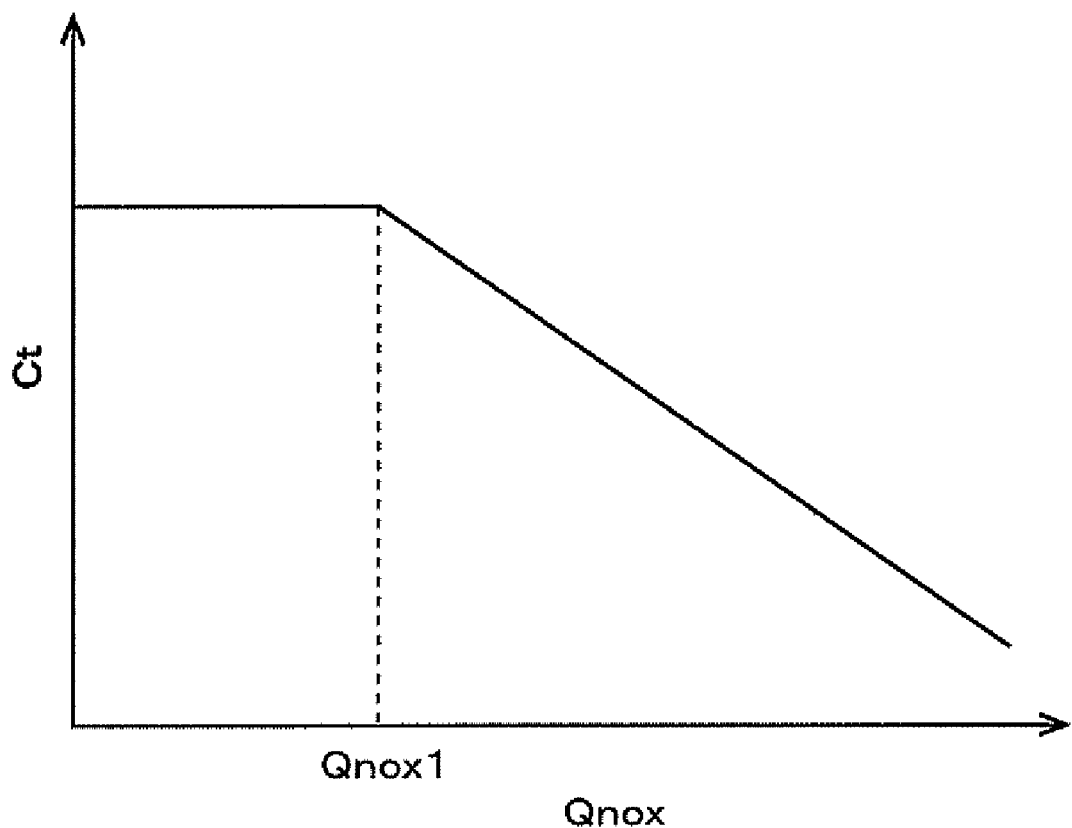
FIG. 10 is a map illustrating the relation between a target $O_2$ concentration and the occluded amount of NOx in a NOx catalyst according to a third embodiment of the present invention.

In this routine, when a positive determination is made in step S104, the ECU 20 advances to S505. In S505, the ECU 20 calculates a target $O_2$ concentration Ct at the time of the execution of $O_2$ concentration lowering control based on the NOx occlusion amount Qnox in the NOx catalyst 10. Here, the target $O_2$ concentration Ct is calculated by assigning the NOx occlusion amount Qnox in the NOx catalyst 10 to a map illustrated in FIG. 10. In FIG. 10, the axis of ordinate denotes the target $O_2$ concentration Ct, and the axis of abscissa denotes the NOx occlusion amount Qnox in the NOx catalyst 10. This map has been stored in the ECU 20 beforehand. Here, note that this map can be such that the target $O_2$ concentration Ct changes with respect to the NOx occlusion amount Qnox in the NOx catalyst 10 in a stepwise manner.

In this embodiment, as shown in FIG. 10, when the NOx occlusion amount Qnox in the NOx catalyst 10 is more than the predetermined amount of occlusion Qnox1 at the time of the execution of the NOx reduction control, the target $O_2$ concentration Ct is set to a lower value in accordance with the increasing NOx occlusion amount Qnox.

Accordingly, the more the NOx occlusion amount Qnox, fuel is supplied to the NOx catalyst 10 with the lower the $O_2$ concentration of the ambient atmosphere of the NOx catalyst 10. Accordingly, the more the NOx occlusion amount Qnox, the more efficiently the NOx occluded in the NOx catalyst 10 is reduced.

Then, the ECU 20 advances to S506, and executes the target $O_2$ concentration lowering control, so that the $O_2$ concentration of the exhaust gas is controlled to the target $O_2$ concentration Ct. Thereafter, the ECU 20 advances to S106.

According to the routine as stated above, when the $O_2$ concentration lowering control is executed at the time of the execution of the NOx reduction control, the target $O_2$ concentration Ct is changed based on the NOx occlusion amount Qnox in the NOx catalyst 10. As a result, the NOx occluded in the NOx catalyst 10 can be reduced to a satisfactory extent while suppressing the $O_2$ concentration of the mixture in the internal combustion engine 1 from being lowered more than necessary.

<Modification>

Figure 11:
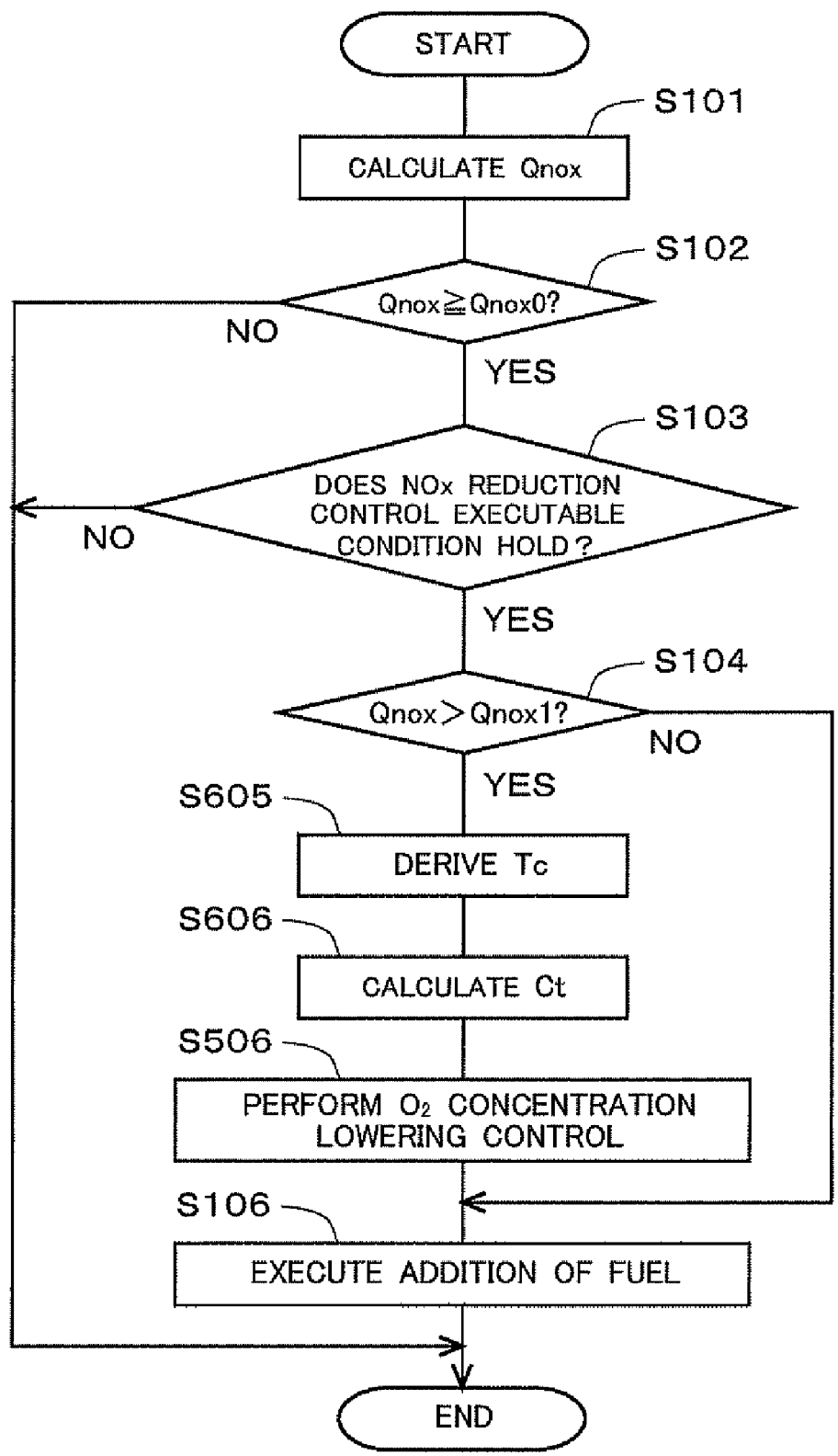
FIG. 11 is a flow chart illustrating a routine for NOx reduction control according to a modification of the third embodiment of the present invention.

Next, reference will be made to a modification of the third embodiment based on FIG. 11. FIG. 11 is a flow chart illustrating a routine for NOx reduction control according to this modification. This routine has been beforehand stored in the ECU 20, and is executed at a specified time interval during the operation of the internal combustion engine 1. Here, note that the flow chart illustrated in FIG. 11 has steps S605 and S606 substituted for S505 in the flow chart illustrated in FIG. 9. Therefore, only steps S605 and S606 will be described below while omitting an explanation of other steps.

In this routine, the ECU 20 advances to S605 after S104. In S605, the ECU 20 derives or obtains the temperature Tc of the NOx catalyst 10 based on a detected value of the temperature sensor 18.

Figure 12:
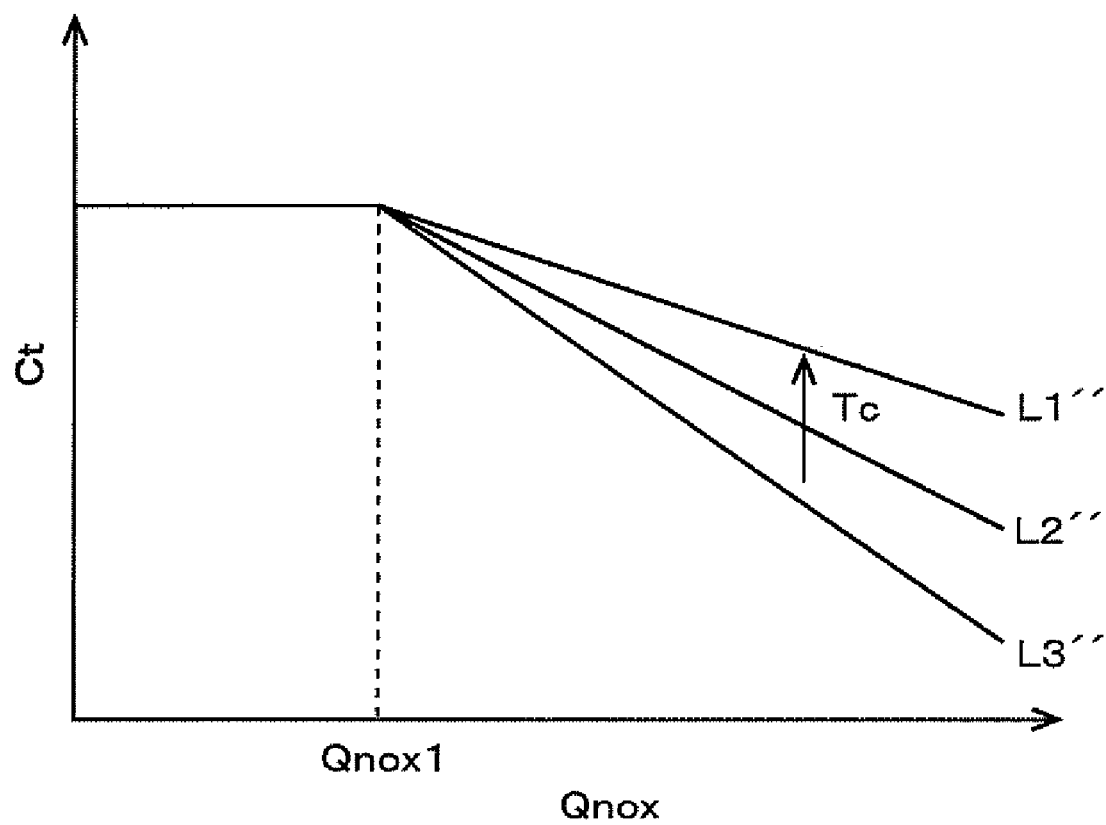
FIG. 12 is a map illustrating the relation between a target $O_2$ concentration, the occluded amount of NOx in a NOx catalyst and the temperature of the NOx catalyst according to the modification of the third embodiment of the present invention.

Then, the ECU 20 advances to S606, and calculates the target $O_2$ concentration Ct by assigning the NOx occlusion amount Qnox in the NOx catalyst 10 and the temperature Tc of the NOx catalyst 10 derived in S605 to a map illustrated in FIG. 12. In FIG. 12, the axis of ordinate denotes the target $O_2$ concentration Ct, and the axis of abscissa denotes the NOx occlusion amount Qnox in the NOx catalyst 10. Also, in FIG. 12, an arrow indicates the temperature Tc of the NOx catalyst 10. In other words, in the map of FIG. 12, there is illustrated the relation between the NOx occlusion amount Qnox in the NOx catalyst 10 and the target $O_2$ concentration Ct corresponding to the temperature Tc of the NOx catalyst 10 (wherein L1" denotes a case in which the temperature Tc of the NOx catalyst 10 is higher than that in L2", and L2" denotes a case in which the temperature Tc of the NOx catalyst 10 is higher than that that in L3"). This map has been stored in the ECU 20 beforehand. Here, note that this map, similar to the map illustrated in FIG. 10, can be such that the target $O_2$ concentration Ct changes with respect to the NOx occlusion amount Qnox in the NOx catalyst 10 in a stepwise manner.

The lower the temperature Tc of the NOx catalyst 10, the more difficult the fuel supplied to the NOx catalyst 10 is to be oxidized. Therefore, in case where the $O_2$ concentration of the ambient atmosphere is the same or unchanged, the lower the temperature Tc of the NOx catalyst 10, the more difficult the reduction of NOx in the NOx catalyst 10 is to be facilitated when fuel is supplied to the NOx catalyst 10.

Accordingly, in this modification, in case where the NOx occlusion amount Qnox in the NOx catalyst 10 is more than the predetermined amount of occlusion Qnox1 at the time of the execution of the NOx reduction control, the target $O_2$ concentration Ct is set to a lower value in accordance with the increasing NOx occlusion amount Qnox. In addition, incase where the NOx occlusion amount Qnox in the NOx catalyst 10 is more than the predetermined amount of occlusion Qnox1 at the time of the execution of the NOx reduction control, the target $O_2$ concentration Ct with respect to the same NOx occlusion amount Qnox is set to a lower value in accordance with the lower temperature Tc of the NOx catalyst 10.

According to the routine as stated above, in case where the NOx occlusion amount Qnox in the NOx catalyst 10 is more than the predetermined amount of occlusion Qnox1 at the time of the execution of the NOx reduction control, the target $O_2$ concentration is decided by taking into consideration not only the NOx occlusion amount Qnox in the NOx catalyst 10 but also the temperature Tc of the NOx catalyst 10. As a result, it is possible to suppress the reduction of the NOx occluded in the NOx catalyst 10 from becoming insufficient while suppressing the $O_2$ concentration of the mixture in the internal combustion engine from being lowered more than necessary.

Here, note that in this modification, the target $O_2$ concentration at the time of the execution of the $O_2$ concentration lowering control can be decided based solely on the temperature Tc of the NOx catalyst 10 without considering the NOx occlusion amount Qnox in the NOx catalyst 10. In this case, too, the target $O_2$ concentration Ct is set to a lower value in accordance with the lower temperature Tc of the NOx catalyst 10.

The above-mentioned first through third embodiments can be combined with one another as long as such combinations are possible.

The invention claimed is:

1. An exhaust gas purification system for an internal combustion engine comprising:
   an exhaust passage;
   an NOx storage reduction catalyst that is arranged in the exhaust passage of the internal combustion engine;
   an $O_2$ concentration lowering device that lowers an $O_2$ concentration of an exhaust gas by lowering an $O_2$ concentration of a mixture in said internal combustion engine;
   a fuel addition valve that supplies a reducing agent to said NOx storage reduction catalyst; and
   an electronic control unit that includes program logic, which when executed:
      estimates an amount of NOx occluded in said NOx storage reduction catalyst;
      determines whether an execution condition for NOx reduction control to cause the NOx occluded in said NOx storage reduction catalyst to be released and at the same time reduced holds; and
      executes NOx reduction control when it is determined that the execution condition for NOx reduction control holds;
   wherein in case where the amount of NOx occluded in said NOx storage reduction catalyst at the time when the execution condition for NOx reduction control holds is more than a predetermined amount of occlusion, said electronic control unit executes NOx reduction control by lowering the $O_2$ concentration of the exhaust gas by means of said $O_2$ concentration lowering device and at the same time supplying the reducing agent to said NOx storage reduction catalyst by means of said fuel addition valve, and in case where the amount of NOx occluded in said NOx storage reduction catalyst at the time when the execution condition for NOx reduction control holds is equal to or less than said predetermined amount of occlusion, said electronic control unit executes NOx reduction control by supplying the reducing agent to said NOx storage reduction catalyst by means of said fuel addition valve without lowering the $O_2$ concentration of the exhaust gas by means of said $O_2$ concentration lowering device.

2. The exhaust gas purification system for an internal combustion engine as set forth in claim 1, wherein
   said predetermined amount of occlusion is made larger when the temperature of said NOx storage reduction catalyst is at a first temperature than when said temperature is at a second temperature lower than the first temperature.

3. The exhaust gas purification system for an internal combustion engine as set forth in claim 1, wherein
   the electronic control unit includes program logic, which when executed, estimates a level of degradation of said NOx storage reduction catalyst; and
   said predetermined amount of occlusion is made smaller when the level of degradation of said NOx storage reduction catalyst is a first level of degradation than when said level of degradation is a second level of degradation lower than the first level of degradation.

4. The exhaust gas purification system for an internal combustion engine as set forth in claim 1, wherein the electronic control unit includes program logic, which when executed, estimates an amount of SOx occluded in said NOx storage reduction catalyst; and said predetermined amount of occlusion is made smaller when the amount of SOx occluded in said NOx storage reduction catalyst is a first occluded amount than when said amount of SOx occluded is a second occluded amount smaller than the first occluded amount.

5. The exhaust gas purification system for an internal combustion engine as set forth in claim 1, wherein in case where the $O_2$ concentration of the exhaust gas is caused to lower by the electronic control unit at the time of the execution of NOx reduction control, the $O_2$ concentration of the exhaust gas is made lower when the amount of NOx occluded in said NOx storage reduction catalyst is a first occluded amount than when said amount of NOx occluded is a second occluded amount smaller than the first occluded amount.

6. The exhaust gas purification system for an internal combustion engine as set forth in claim 1, wherein in case where the $O_2$ concentration of the exhaust gas is caused to lower by the electronic control unit at the time of the execution of the NOx reduction control, the $O_2$ concentration of the exhaust gas is made lower when the temperature of said NOx storage reduction catalyst is at a first temperature than when said temperature is at a second temperature higher than the first temperature.

* * * * *